(12) United States Patent
Fujiwara et al.

(10) Patent No.: US 7,779,502 B2
(45) Date of Patent: Aug. 24, 2010

(54) CLEANING ITEM

(75) Inventors: Masatoshi Fujiwara, Kagawa-ken (JP); Hirokuni Ono, Tokyo (JP)

(73) Assignee: Uni-Charm Corporation, Ehime-ken (JP)

( * ) Notice: Subject to any disclaimer, the term of this patent is extended or adjusted under 35 U.S.C. 154(b) by 1087 days.

(21) Appl. No.: 11/224,058

(22) Filed: Sep. 13, 2005

(65) Prior Publication Data

US 2006/0101601 A1 May 18, 2006

(30) Foreign Application Priority Data

Nov. 16, 2004 (JP) .............................. 2004-332496

(51) Int. Cl.
 *A47L 13/20* (2006.01)
(52) U.S. Cl. .......................... 15/229.4; 15/223; 15/226; 15/228
(58) Field of Classification Search .................. 15/223, 15/226, 228, 229.1–229.9
See application file for complete search history.

(56) References Cited

U.S. PATENT DOCUMENTS

| | | | |
|---|---|---|---|
| 823,725 A | 6/1906 | Hayden |
| 1,437,145 A | 11/1922 | Johnson |
| 1,542,108 A | 6/1925 | Taylor |
| 3,525,113 A | 8/1970 | Leland |
| 3,822,435 A | 7/1974 | Moss |
| 5,452,491 A | 9/1995 | Thompson |
| 5,613,263 A | 3/1997 | Nolte |
| 5,715,560 A | 2/1998 | Banicki |
| 5,953,784 A | 9/1999 | Suzuki et al. |
| 6,143,393 A | 11/2000 | Abe et al. |
| 6,241,835 B1 | 6/2001 | Abe et al. |
| 6,813,801 B2 | 11/2004 | Tanaka et al. |
| 2002/0148061 A1* | 10/2002 | Tanaka et al. ............... 15/229.3 |
| 2004/0016074 A1 | 1/2004 | Tanaka |
| 2005/0172440 A1* | 8/2005 | Lin .............................. 15/226 |

FOREIGN PATENT DOCUMENTS

| | | |
|---|---|---|
| CN | 351980 A1 | 2/1999 |
| CN | 394679 A1 | 6/2000 |
| CN | 463698 A1 | 11/2001 |
| CN | 1457242 A | 11/2003 |
| DE | 38 02 198 C2 | 6/1989 |
| DE | 29 701 349 | 4/1997 |
| EP | 0 739 600 | 10/1996 |
| EP | 0 774 229 A2 | 5/1997 |
| EP | 0 777 997 A2 | 6/1997 |

(Continued)

OTHER PUBLICATIONS

Japanese Office Action for Application No. 2004-332496 issued Mar. 23, 2010.

*Primary Examiner*—Mark Spisich
(74) *Attorney, Agent, or Firm*—Lowe Hauptman Ham & Berner, LLP (57) ABSTRACT

The cleaning item of the present invention comprises: a brush part constructed from fibrous material; an inserted part with an inserted space into which a gripper is detachably inserted and which is formed by a pair of sheets, the inserted part being disposed in the brush part; and a joining member which joins the brush part and the inserted part.

20 Claims, 12 Drawing Sheets

FOREIGN PATENT DOCUMENTS

| | | |
|---|---|---|
| EP | 0 923 902 A2 | 6/1999 |
| EP | 0 968 677 A2 | 1/2000 |
| JP | A-H07-067821 | 3/1995 |
| JP | A-H09-038009 | 2/1997 |
| JP | A-H09-047416 | 2/1997 |
| JP | A-H09-154791 | 6/1997 |
| JP | A-H10-235574 | 9/1998 |
| JP | A-H11-089776 | 4/1999 |
| JP | 11235301 A | 8/1999 |
| JP | A-H11-235301 | 8/1999 |
| JP | A-H11-276402 | 10/1999 |
| JP | A-2001-299657 | 10/2001 |
| JP | A-2001-299658 | 10/2001 |
| JP | A-2002-159427 | 6/2002 |
| JP | A-2002-165742 | 6/2002 |
| JP | 2002369783 A | 12/2002 |
| JP | A-2002-369783 | 12/2002 |
| JP | A-2003-261899 | 9/2003 |
| JP | A-2003-265389 | 9/2003 |
| JP | A-2004-49618 | 2/2004 |
| JP | A-2004-49619 | 2/2004 |
| JP | 3103720 U | 8/2004 |
| JP | A-2004-298650 | 10/2004 |
| WO | 2006121802 A | 11/2006 |

\* cited by examiner

CLEANING ITEM

INCORPORATION BY REFERENCE

Priority is claimed on Japanese Patent Application No. 2004-332496, filed Nov. 16, 2004, the content of which is incorporated herein by reference.

FIELD OF THE INVENTION

The present invention relates to a cleaning item for indoor-use having fibrous material, and more particularly, relates to a cleaning item used by attaching a brush part having fibrous material to a gripper.

DESCRIPTION OF RELATED ART

As disposable or replaceable conventional indoor cleaning items, there are items which have a brush part made from fibrous material such as, for example, tow fiber bundles or sheets cut into strips.

As cleaning tool such as this, for example, a cleaning tool is disclosed in the Patent Document 1, US Patent Publication No. 898725, wherein a part of the sheets forming the brush is composed of felt or fiber and is used by fixing a handle to a predetermined position between the sheets.

Furthermore, in the Patent Document 2, Japanese Patent Laid-Open Publication No. 11-235301, a cleaning tool wherein layers made from at least one of long fibers or strips of sheets are layered and joined by a plurality of compound lines on one side or both sides of a base material sheet, and the base material sheet and this layer are disconnected is disclosed.

Still further, in the Patent Document 3, Japanese Patent Publication No. 2002-369783, a cleaning tool which has a brush part wherein the brush part is a plurality of long and narrow strips formed from flexible sheets, fiber bundles and base material sheet layered and partially joined is disclosed.

However, the cleaning tool in Patent Document 1 is a cleaning tool which is used by fixing the handle, and the gripper cannot be attached or removed. Therefore, it is unsuitable as a cleaning tool wherein the main cleaning part is disposable.

In addition, the cleaning tool in Patent Document 2 is suited for floors and does not have an inserted part for insertion enabling the attachment and removal of a gripper.

Furthermore, the cleaning tool in Patent Document 3 has an inserted part for insertion enabling the attachment and removal of a gripper, but the fiber bundles, base material sheet and a retention sheet are joined and integrated by heat-sealing in a completely layered state. Therefore, it is necessary to firmly join respective components to thick sheets and fiber layers by heat-sealing, and in order to prevent the reduction of strength of the joint part due to excessive heat-sealing, perform fine adjustment of temperatures and pressure when heat-sealing.

The present invention has been made with the foregoing issues under consideration, and the object thereof is to provide a cleaning item wherein the insertion part of a gripper can be provided easily and the manufacturing process is simple.

SUMMARY OF THE INVENTION

As a result of keen research into resolving the foregoing issues, the inventors of the present invention have discovered that the foregoing issues can be resolved by separately manufacturing a brush part in the main cleaning part and an inserted part for the insertion of an insertion part of the gripper and subsequently joining the two together, and thereby, completed the present invention. More specifically, the present invention provides the following:

(1) A cleaning item comprising a brush part constructed from fibrous material; an inserted part with an inserted space into which a gripper is detachably inserted and which is formed by a pair of sheets, the inserted part being disposed in the brush part; and a joining member which joins the brush part and the inserted part.

According to the cleaning item of the present invention, the main cleaning item comprises the brush part and the inserted part for the insertion of a gripper, each of which are manufactured separately. Additionally, these parts are joined by adhesive and the like. Therefore, in the joining process, it is not necessary to linearly heat-seal the entire brush part and inserted part, and the tolerance of the conditions of heat-sealing in the formation of the brush part and the inserted part is high. In addition, because the heat-sealing line of the brush part and the heat-sealing line of the inserted part can be designed irrespectively, the degree of freedom in design is also high. Furthermore, even if there are irregularities in the thickness and shape of the brush part, the shape of the inserted part can be designed freely and independently and attached. Still further, because the manufacturing process is simple and the number of parts is equal to that of conventional material, the cleaning item can be provided at low costs.

(2) The cleaning item according to (1), wherein said joining member is an adhesive.

According to the invention (1), the brush part and the inserted part can be joined faster, more accurately and at a lower cost.

(3) The cleaning item according to (1), wherein said joining member is heat-sealing of a section in said inserted part excluding the inserted space and said brush part.

According to the invention (3), because only a section of the brush part is integrated with the inserted part, they can be joined without affecting the degree of freedom or the shape of the brush part.

(4) The cleaning item according to any one of (1) to (3), wherein the gripper comprises: a base portion: and a plurality of insertion parts which extend substantially parallel from the base portion, and the inserted part comprises a plurality of spaces into which respective insertion parts can be inserted.

According to the invention (4), because the inserted part has a plurality of spaces to which respective insertion parts can be inserted, instances wherein plural insertion parts of the gripper exist can also be handled.

(5) The cleaning item according to any one of (1) to (4), wherein a plurality of inserted parts for the insertion of a plurality of said insertion parts is positioned substantially parallel on said brush part.

According to the invention (5), the position of the plural inserted parts can be placed freely according to the plural insertion parts.

(6) The cleaning item according to any one of (1) to (5), wherein said joining member is hot-melt.

According to this invention (6), by implementing hot-melt as the joining member, the brush part and the inserted part can be joined faster, more accurately, and at a lower cost.

(7) The cleaning item according to any one of (1) to (6), wherein the brush part is a tow fiber bundle and/or sheets cut into strips.

According to the invention (7), by implementing tow fiber bundle and/or sheets cut into strips as the fibrous material, dirt and dust can be gathered more efficiently, and a more effective cleaning can be performed.

(8) A manufacturing method for a cleaning item comprising a brush part constructed from fibrous material; and an inserted part with an inserted space into which a gripper is detachably inserted and which is disposed in the brush part; comprising: a brush part formation step for forming the brush part by joining and integrating a section of a fibrous material; an inserted part formation step for forming the inserted part having the inserted space by layering a pair of sheets and joining a section thereof; and a joining step for joining the brush part and the inserted part.

According to the manufacturing method of the cleaning item of the present invention, the main cleaning part comprises a brush part and an inserted part for the insertion of a gripper, each of which are manufactured separately. Additionally, these parts are joined by adhesive. Therefore, because it is unnecessary to linearly heat-seal the entire brush part and inserted part, the tolerance of the conditions of heat-sealing in the formation of the brush part and the inserted part is high. In addition, because the heat-sealing line of the brush part and the heat-sealing line of the inserted part can be designed irrespectively, the degree of freedom in design is also high. Furthermore, even if there are irregularities in the thickness and the shape of the brush part, the shape of the inserted part can be designed freely and independently and attached. Still further, because the manufacturing process is simple and the number of parts is equal to that of conventional material, cleaning item can be provided at low costs.

According to the present invention, a cleaning item which can easily set the insertion part of the gripper can be provided.

DESCRIPTION OF THE PREFERRED EMBODIMENT

Each embodiment of an example of the cleaning item of the present invention is described below based on the drawings. In the description of the embodiments below, the same reference numbers are affixed to the same construction requisite and explanations thereof are omitted or simplified.

First Embodiment

Figure 1:
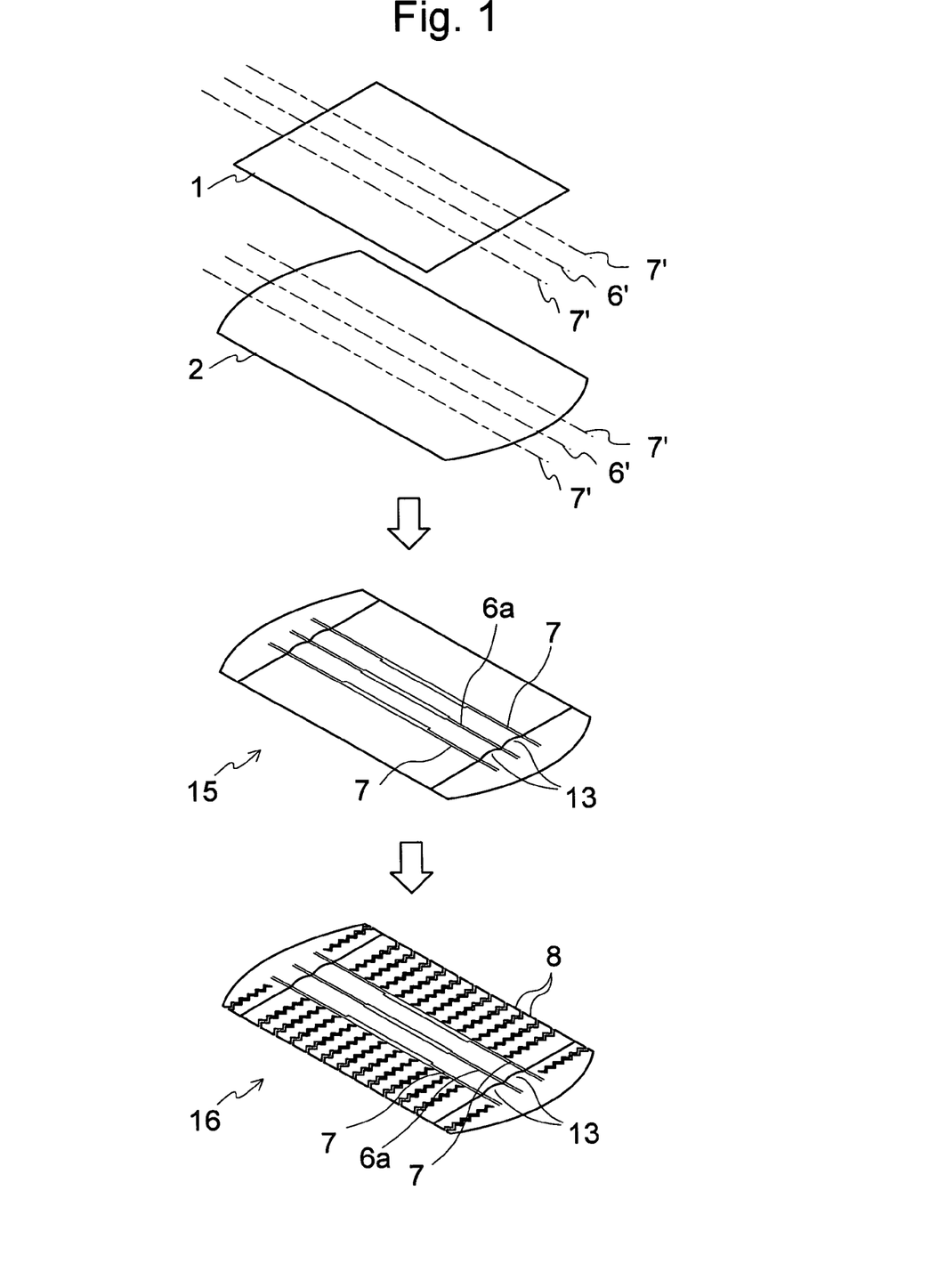
FIG. 1 is a diagram showing the manufacturing process of the cleaning item of the first embodiment and is an exploded perspective view of the inserted part formation process.
Figure 2A:
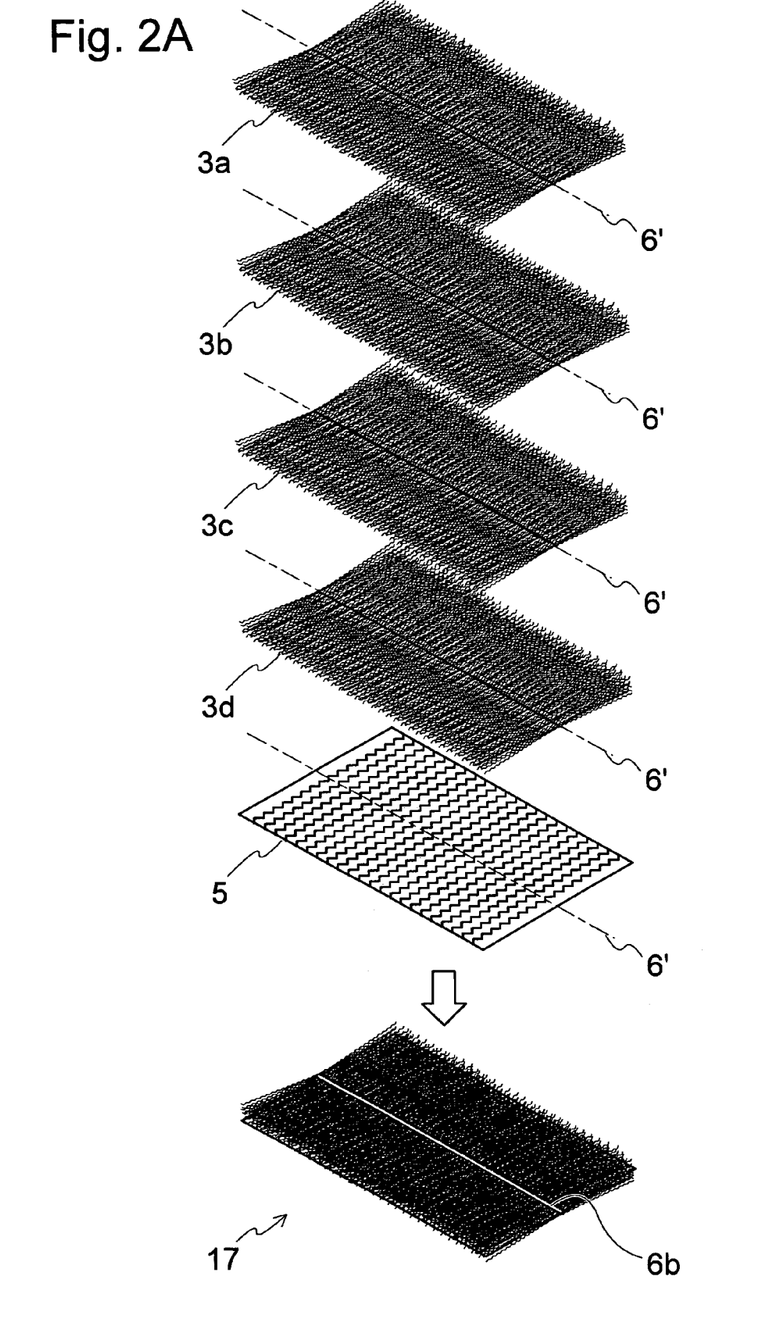
FIG. 2A is a diagram showing the manufacturing process of the cleaning item of the first embodiment and is an exploded perspective view of the brush part formation process.
Figure 2B:
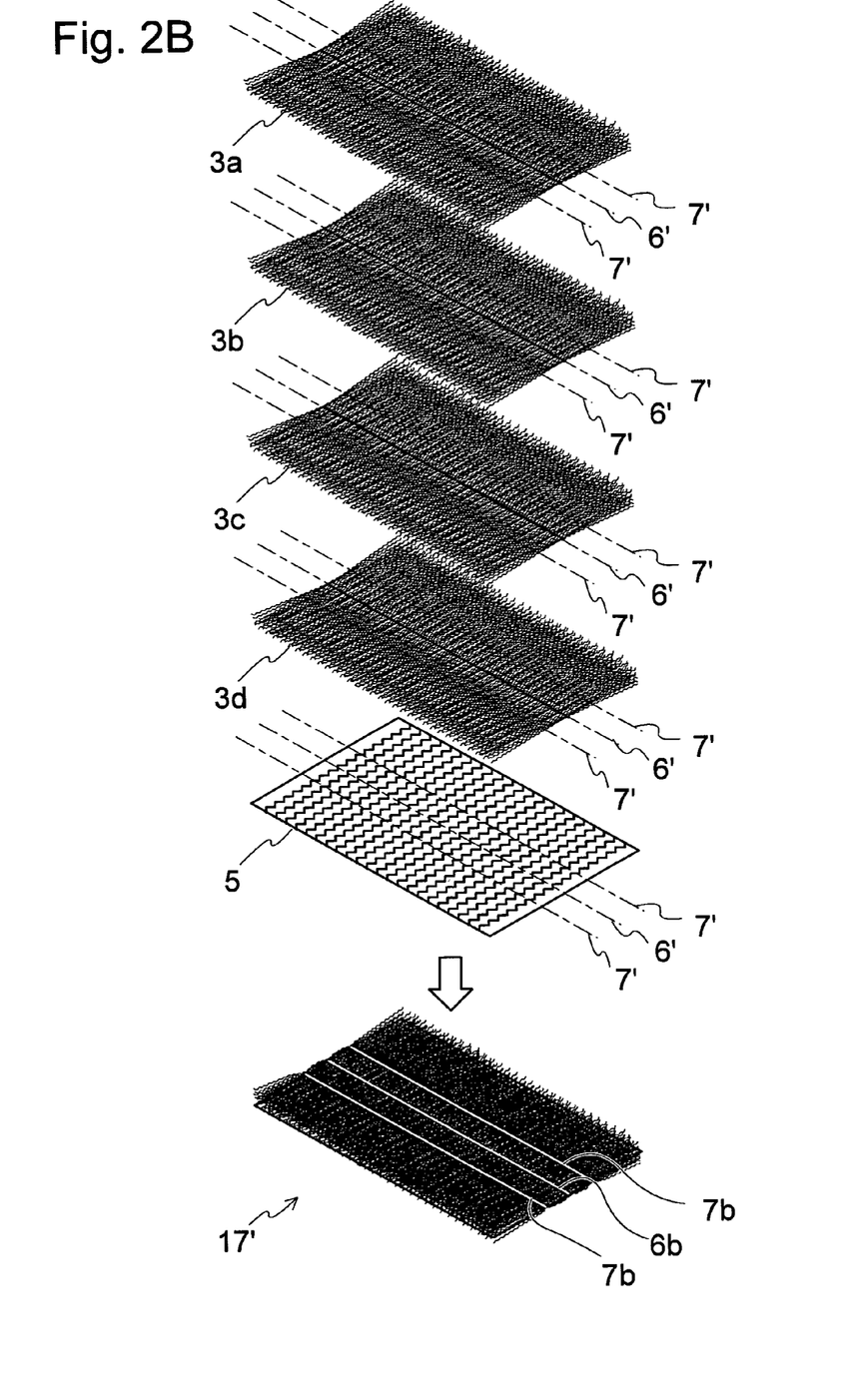
FIG. 2B is a diagram showing the manufacturing process of the cleaning item of the first embodiment and is an exploded perspective view of the brush part formation process.
Figure 3:
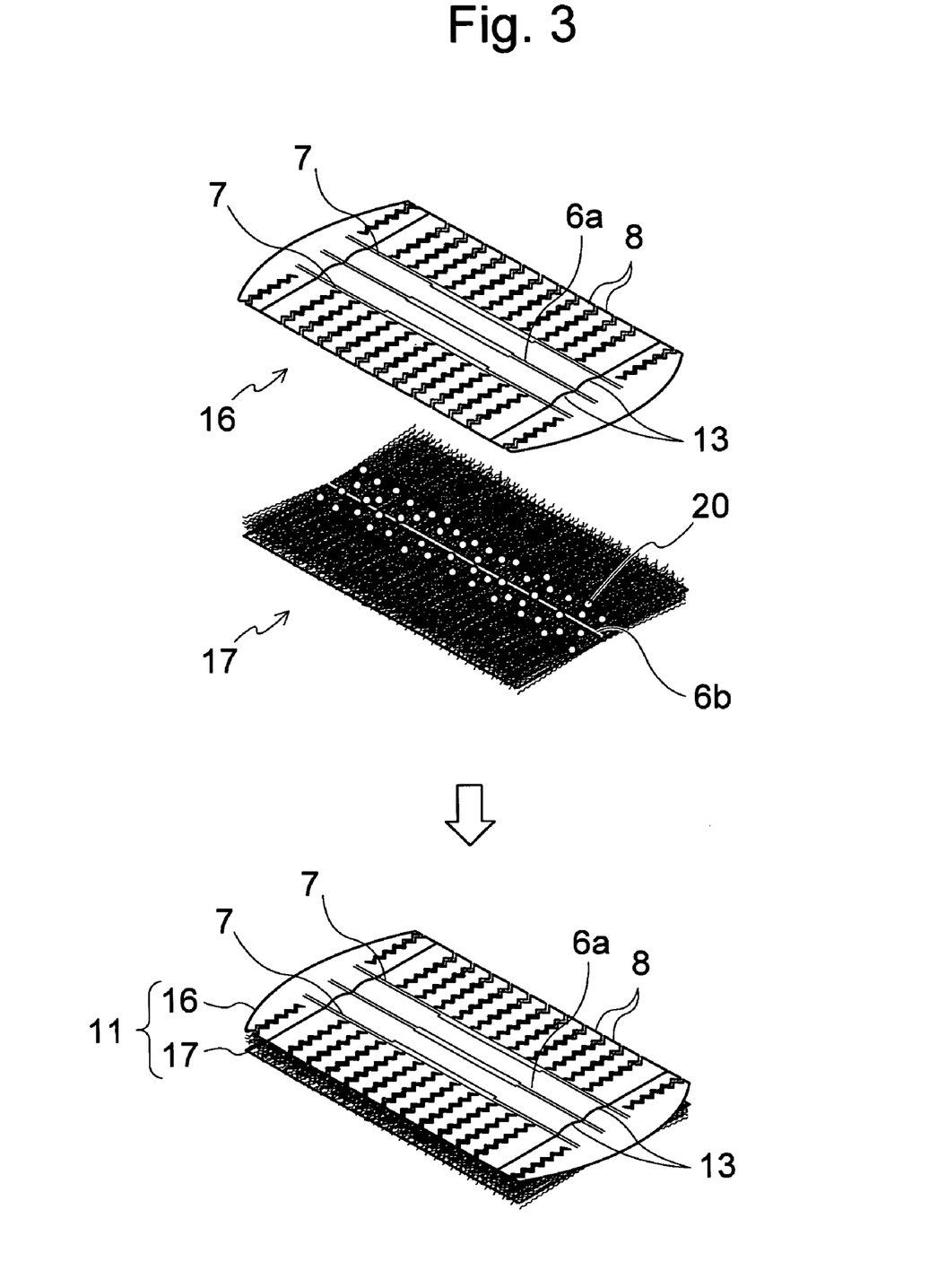
FIG. 3 is diagram showing the manufacturing process of the cleaning item of the first embodiment and is an exploded perspective view of the joining process.
Figure 4:
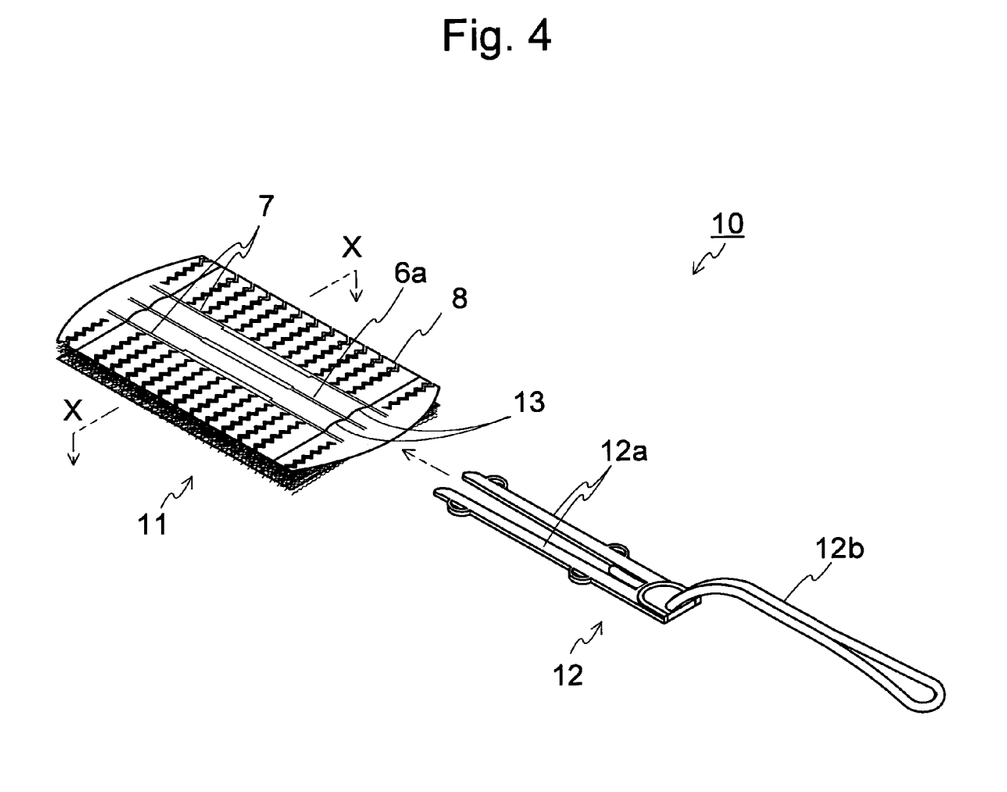
FIG. 4 is a perspective view of the cleaning item.

In FIG. 1 to FIG. 5, the first embodiment of a cleaning item and a manufacturing method thereof of the present invention are shown. FIG. 1 is a diagram showing the manufacturing process of the cleaning item and is an exploded perspective view of the inserted part formation process; FIG. 2A and FIG. 2B are diagrams showing the manufacturing process of the present invention and is an exploded perspective view of the brush part formation process; FIG. 3 is diagram showing the manufacturing process of the cleaning item and is an exploded perspective view of the joining process; FIG. 4 is a perspective view of the cleaning item; and FIGS. 5A and 5B are cross-sectional views in the X-X direction in FIG. 4. The first embodiment is explained below in line with the manufacturing process of the cleaning item.

<Inserted Part Formation Process>

First, as shown in FIG. 1, retention sheet 1 and base material sheet 2 are layered and heat-sealed on the two lines, joining line 7' and the joining line 6' which is located roughly at the center thereof, and a joined body 15 is formed. Through this, two inserted spaces 13 and 13 are formed between the retention sheet 1 and the base material sheet 2 by the two lines, inserted part sealing line 7 and inserted part sealing line 6a. The retention sheet 1 and the base material sheet 2 are preferably heat-sealable material such as non-woven fabric, for example. "Heat-sealing" for forming sealing lines in the present invention includes, other than heat sealing through simply pressing a heated sealing bar, methods such as impulse sealing, high-frequency sealing, and ultrasonic sealing.

Next, a strip part 8 is formed by slitting the joined body 15 from both sides, and an inserted part 16 is formed. The strip part does not have to be formed in the inserted part according to the present invention. In addition, the formation method of the inserted part according to the present invention is not limited to the inserted part 16, above, but must be joined to a brush part and the space for the insertion of the insertion part must be formed by a pair of sheets.

<Brush Part Formation Process>

As shown in FIG. 2A, a first fiber bundle 3a made from tow fiber, a second fiber bundle 3b made from tow fiber, a third fiber bundle 3c made from tow fiber, a fourth fiber bundle 3d made from tow fiber, and strip sheet 5 on which a plurality of strips are formed are layered in sequential order. Then, all five sheets are joined by heat-sealing on joining line 6', and a brush part 17 is formed. In other words, in this brush part 17, all layers are integrated by a brush sealing line 6b.

In the present invention, the brush sealing line, above, is not limited to one sealing line, and for example, as shown in FIG. 2B, can comprise a plurality of sealing lines such as the three brush sealing lines 6b and 7b. In addition, the lines can be zig-zag lines or curved lines rather than straight lines and can be a dot-shaped point seal as well.

By providing a plurality of sealing lines as in FIG. 2B, it becomes difficult for the fibers to move between the plurality of sealing lines 7b-6b-7b, and the maintaining of planarity is facilitated. Therefore, the joining to the joined part in the joining process is facilitated and joining can be performed accurately. In addition, by providing a fiber part which does not easily move in the center section due to the space between the plurality of sealing lines 7b-6b-7b, the fiber part (fiber part which has the brush effect) which are in a loose state on the outside of sealing line 7B (both sides) are adequately separated from each other. Therefore, this effectively prevents the fiber parts of both sides from tangling together and reducing the brush effect.

Although conventionally known tow fiber can be used for fiber bundles 3a to 3d and is not particularly limited thereto, it is preferable that the material is heat-sealable. In addition, the number of fiber bundle layers is not limited and can be one layer. The strip sheet 5 is preferably heat-sealable material such as non-woven fabric, for example, as is for the afore-mentioned retention sheet 1 and base material sheet 2. According to the present invention, the material forming the brush part 17 is not limited to a combination of tow fiber bundles and sheets cut into strips and can be only tow fiber bundles or only sheets cut into strips. In addition, the material composing the brush part 17 must be fibrous material, and can be material other than the afore-mentioned tow fiber bundles and/or sheets cut into strips, such as woven material, knitted material, or rope-like material. As "sheets cut into strips", strip sheets on which plural slits are formed on sheet made from fibrous material from the outer edge to the direction of the center line of the sheet are preferably implemented.

<Joining Process>

The foregoing inserted part 16 and the brush part 17 are joined by hot-melt 20. More specifically, hot-melt 20 is applied in roughly the center section on the first fiber bundle 3a of the brush part 17, preferably between the inserted part sealing lines 7 and 7 and joined to obtain the main cleaning part 11 (hereinafter, the cleaning item according to the present invention).

Although the joining members for the inserted part 16 and the brush part 17 must be a known adhesive and is not particularly limited, conventionally known hot-melt is particularly preferable. In addition, adhesive can be applied on the inserted part 16—side, the brush part 17—side, or both sides. Furthermore, the application location is not particularly limited, but must be in a location wherein the inserted part 16 and the brush part 17 can be joined.

In the present invention, the joining member is not limited to adhesives, and the outer boarder part of the inserted part can be joined by dotted heat-sealing (in other words, point-sealing). For example, if the outer boarder part of the inserted part is heat-sealed by a 1 mm×1 mm or 1 mm×2 mm point-seal pattern, only a small section of the brush part is integrated with the inserted part, and therefore, they can be joined without affecting the degree of freedom or the shape of the brush part. This method is used preferably when forming the inserted part on strip sheet in particular, such as in the second embodiment, described hereafter.

<Function>

In the main cleaning part 11 obtained by the foregoing manufacturing method, two inserted spaces 13 and 13 are formed between the retention sheet 1 and the base material sheet 2, as shown in FIG. 4. In addition, gripper 12 is formed from insertion part 12a and 12a which are separated into two from the base part 12b and extends roughly parallel. The cleaning tool 10 can be used by inserting this insertion part 12a into the inserted space 13 and 13.

Figure 5A:
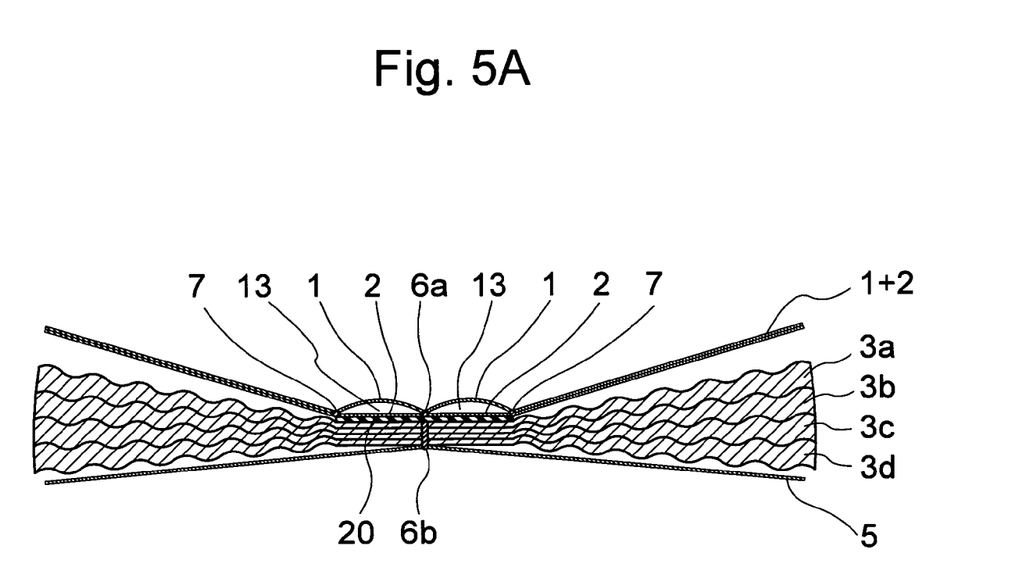
FIGS. 5A and 5B are cross-sectional views taken along the X-X direction in FIG. 4.
Figure 5B:
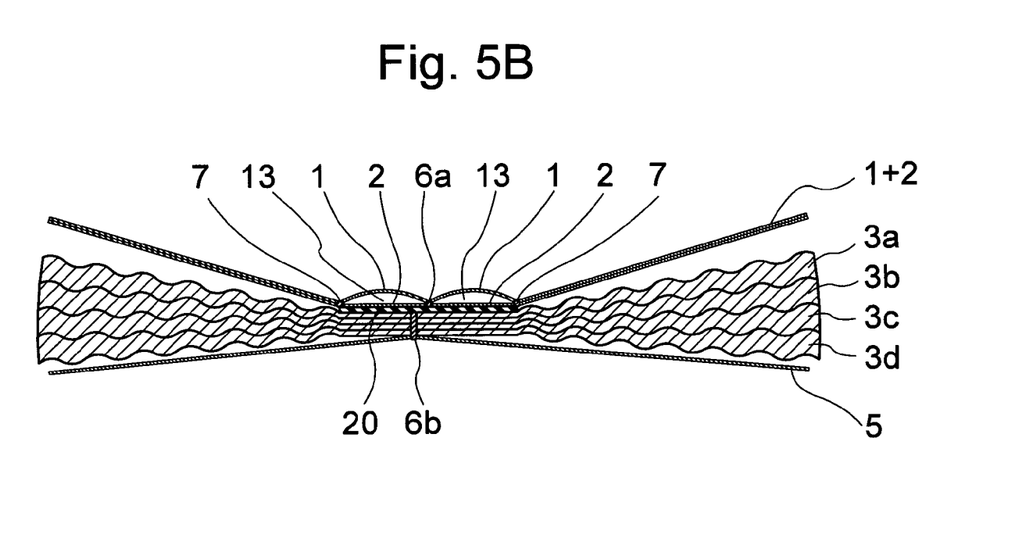

Here, as shown in FIG. 5A, in this cleaning tool 10, the brush part 17 and the inserted part 16 of the main cleaning part 11 are joined by hot-melt 20, and there are no sealing lines which join all layers. Therefore, as shown in FIG. 5B, even when the inserted part sealing line 6a and the brush part sealing line 6b are misaligned, the inserted space 13 is not affected. Therefore, in the joining process, an effect is achieved in that mechanical positioning accuracy does not really have to be taken into consideration.

Second Embodiment

Figure 6:
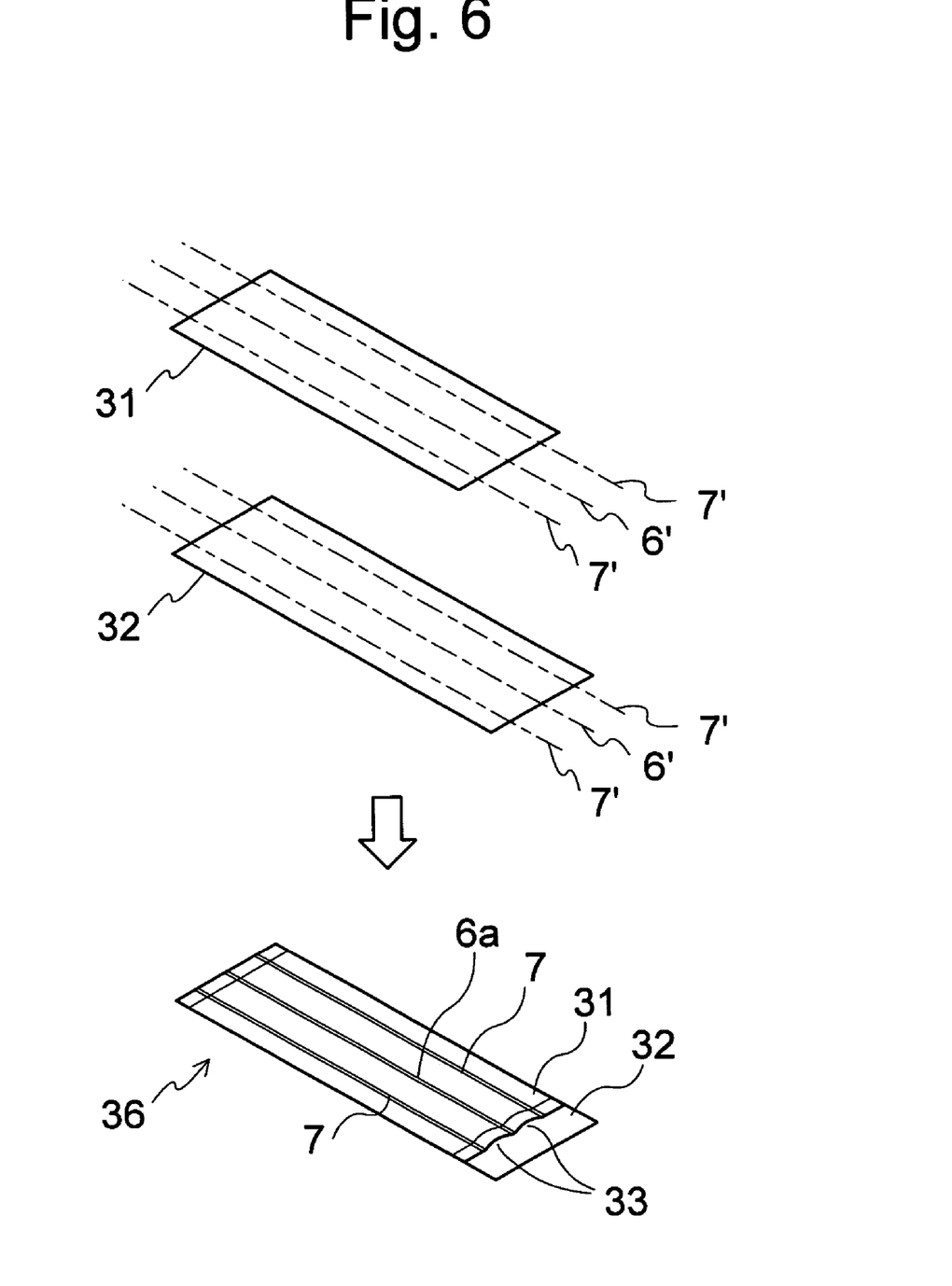
FIG. 6 is a diagram showing the manufacturing process of the cleaning item of the second embodiment and is an exploded perspective view of the inserted part formation process embodiment.
Figure 7:
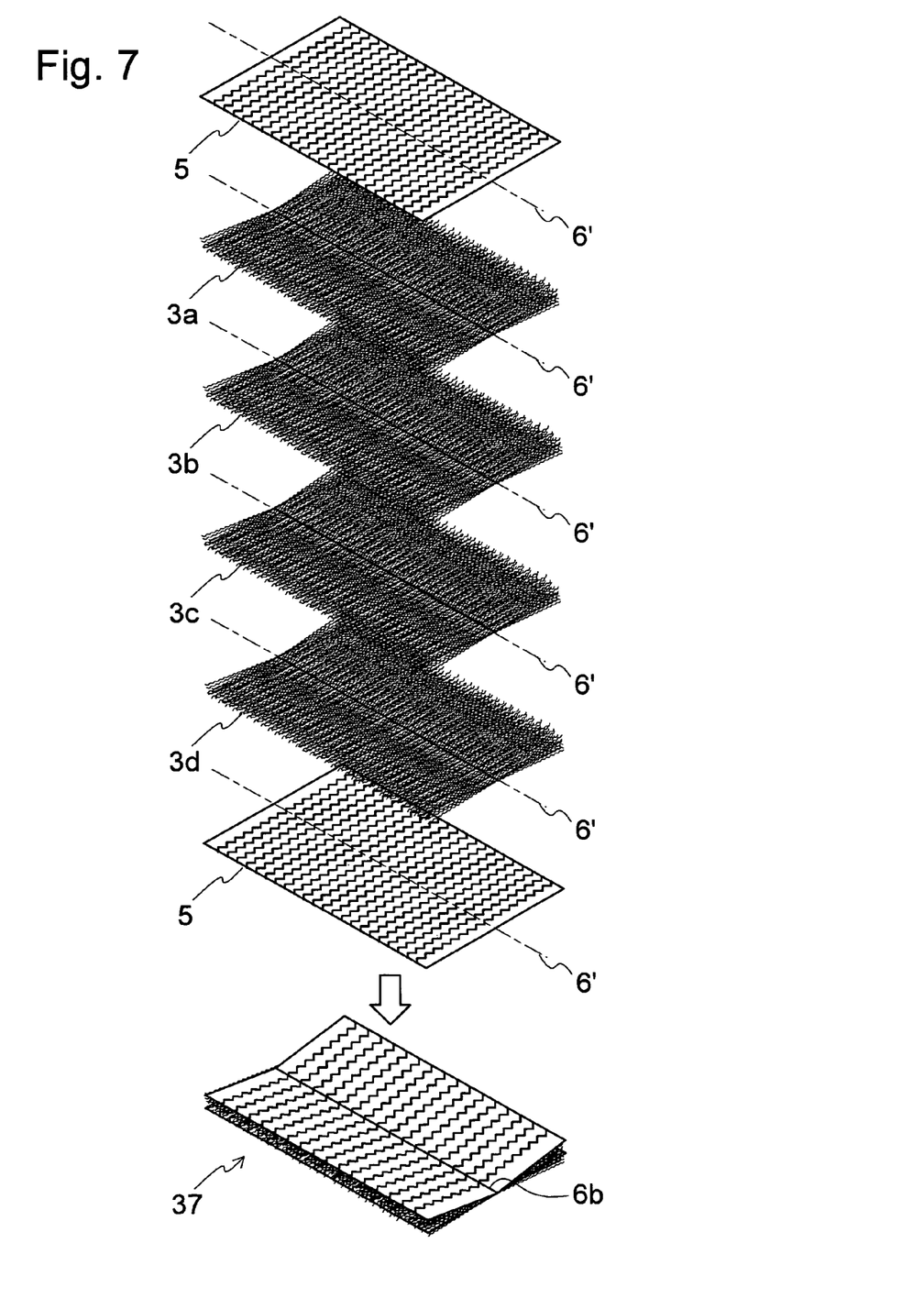
FIG. 7 is a diagram showing the manufacturing process of the cleaning item of the second embodiment and is an exploded perspective view of the brush part formation process.
Figure 8:
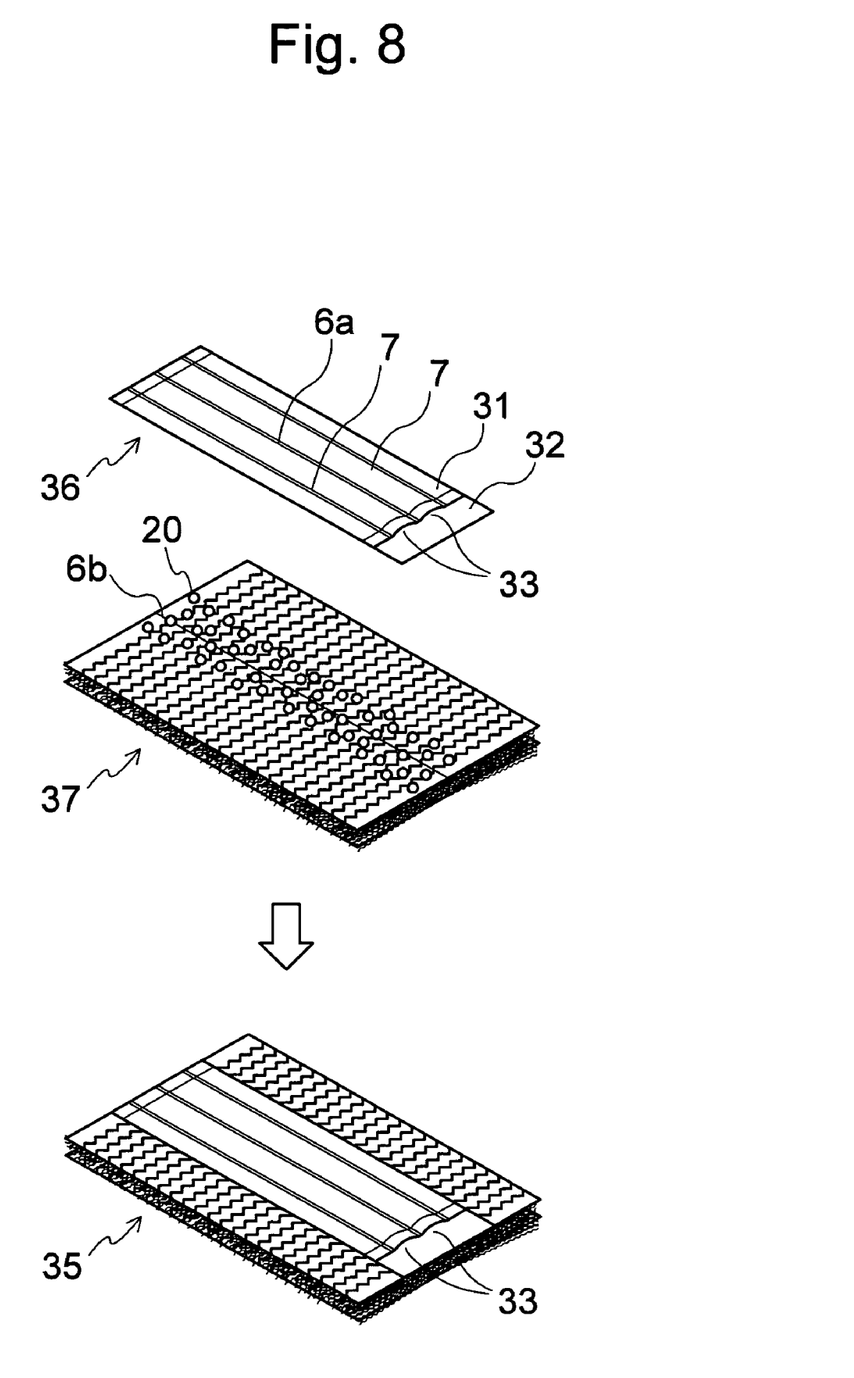
FIG. 8 is diagram showing the manufacturing process of the cleaning item of the second embodiment and is an exploded perspective view of the joining process.

The manufacturing method of a cleaning item according to a second embodiment of the present invention is shown in FIG. 6 to FIG. 8. FIG. 6 is an exploded perspective diagram showing an inserted part formation process; FIG. 7 is an exploded perspective diagram showing a brush formation process; and FIG. 8 is an exploded perspective diagram showing a joining process.

According to this embodiment, the process differs from the first embodiment in that only inserted space 33 is formed in the inserted part formation process, strip part is not formed on the inserted part 36, and on the other hand, a strip sheet having a strip part is provided at the uppermost section of the brush part 37.

The cleaning item comprises a brush part wherein tow fiber bundle and strip sheet on which plural slits are formed from the outer boarder of a sheet formed from fibrous material are layered and the area in the vicinity of the center line of the layered body is integrated by a plurality of heat-sealing lines and an inserted part wherein an inserted space for insertion enabling the attachment and removal of a gripper are formed by heat-sealing a pair of sheets. The inserted part is located on the strip sheet and the strip sheet of the brush part and the inserted part are joined by adhesive.

In the inserted part formation process, as shown in FIG. 6, inserted part 36 which has two inserted spaces 33 by layering retention sheet 31 an dbase material sheet 32 and heat-sealing on two lines, joining line 7' and joining line 6' which is located roughly in the central part, is formed and the process is completed.

On the other hand, in the brush part formation process, as shown in FIG. 7, strip sheet 5 on which plural strip pieces are formed, a first a first fiber bundle 3a made from tow fiber, a second fiber bundle 3b made from tow fiber, a third fiber bundle 3c made from tow fiber, a fourth fiber bundle 3d made from tow fiber, and another strip sheet 5 on which plural strip pieces are formed, are layered in sequential order. Then, the brush part 37 is formed by joining all six sheets by heat-sealing on the joining line 6'. In other words, this brush part 37 has strip sheet 5 in the uppermost section and all layers are integrated by the brush part sealing line 6b.

Additionally, in the joining process, as shown in FIG. 8, the main cleaning part 35 is obtained by applying hot-melt 20 to the strip sheet 5 of the brush part 37 and joining the brush part 37 and the inserted part 36. By applying hot-melt 20 onto a strip sheet 5 which is smoother than tow fiber in this way, brush part 37 and inserted part 36 can be joined more securely.

Third Embodiment

Figure 9:
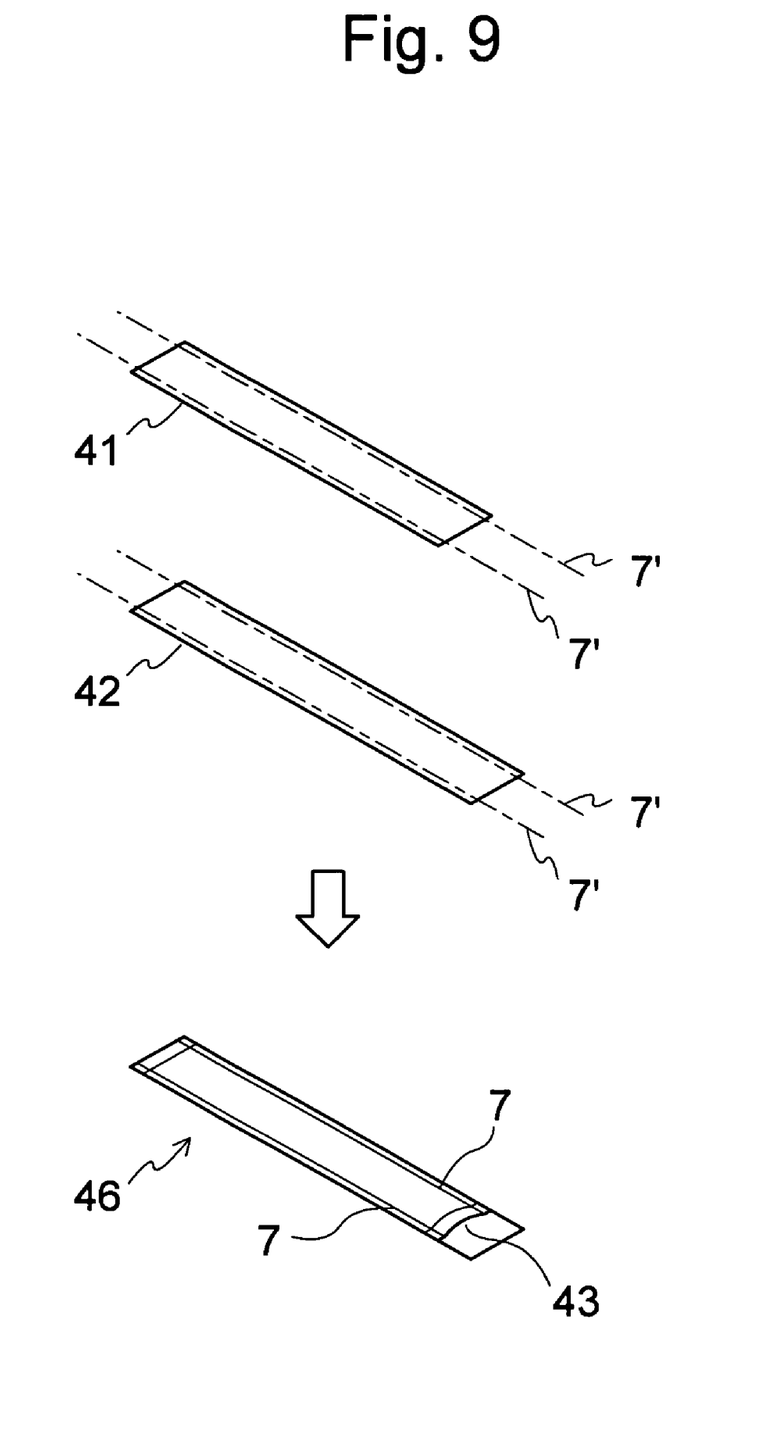
FIG. 9 is a diagram showing the manufacturing process of the cleaning item of the third embodiment and is an exploded perspective view of the inserted part formation process embodiment.

The manufacturing method of a cleaning item according to a third embodiment of the present invention is shown in FIG.

Figure 10:
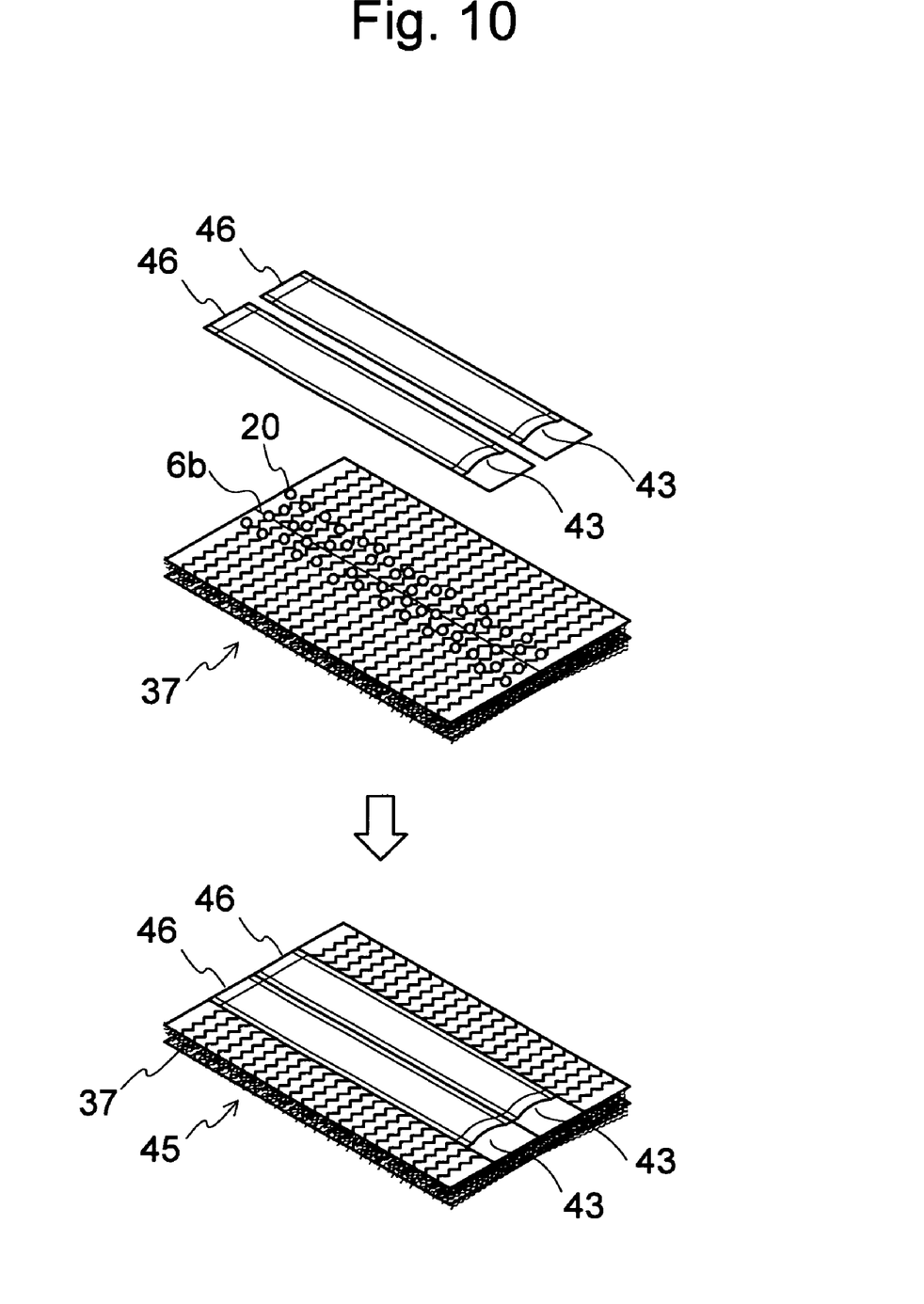
FIG. 10 is a diagram showing the manufacturing process of the cleaning item of the third embodiment and is an exploded perspective view of the brush part formation process.

9 and FIG. 10. FIG. 9 is an exploded perspective view showing an inserted part formation process and FIG. 10 is an exploded perspective view showing a joining process.

This embodiment differs from the second embodiment in that, as shown in FIG. 9, in the inserted part formation process, an inserted part 46 which has one inserted space 43 is formed, and in the joining process, two inserted parts 46 are positioned roughly parallel on the brush part 37. The same brush as that in the second embodiment is used as brush part 37.

In the inserted part formation process, as shown in FIG. 9, an inserted part 46 with only one inserted space 43 is formed by layering retention sheet 41 and base material sheet 42 and heat-sealing only on two joining lines 7'.

Figure 11:
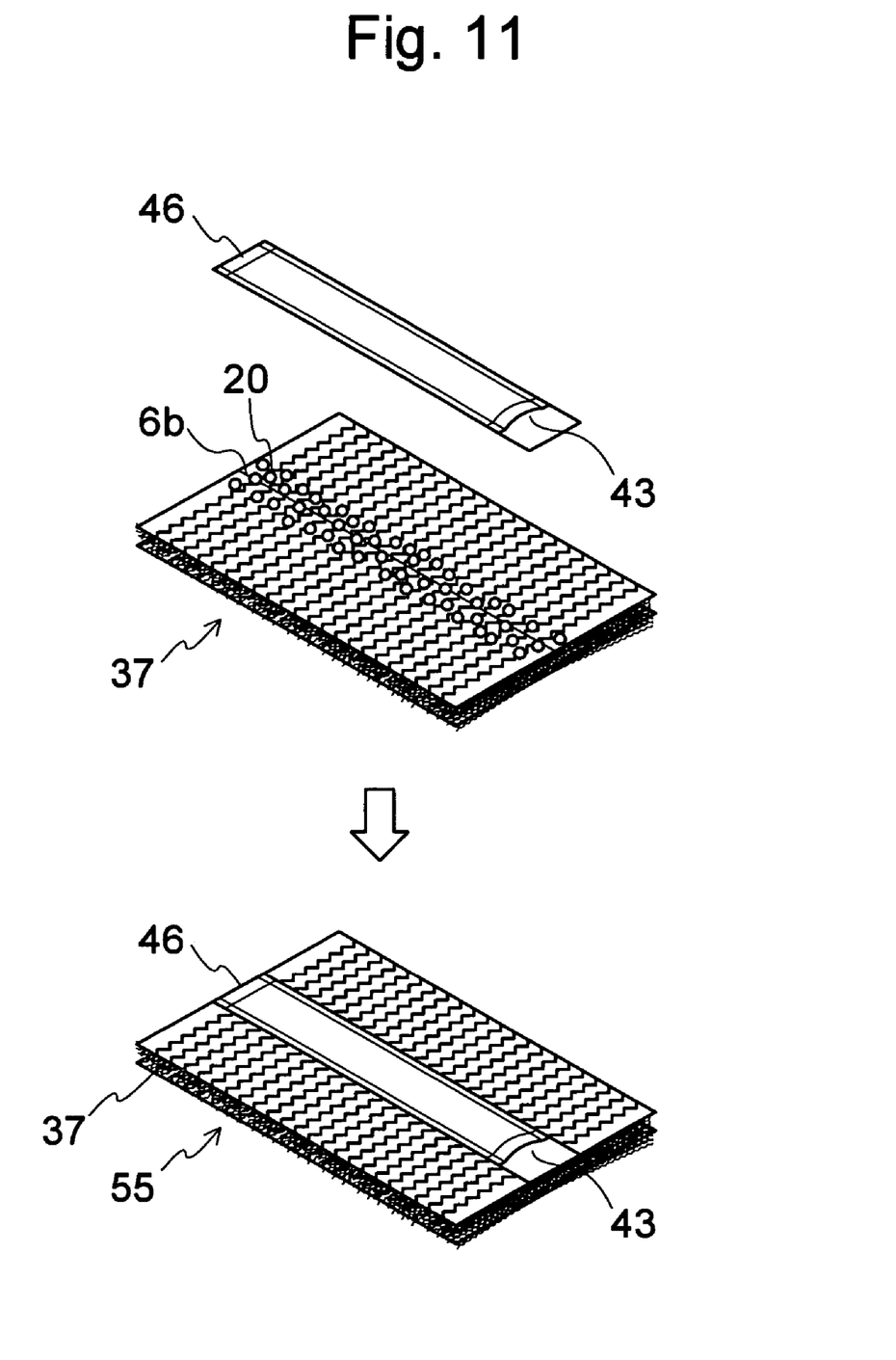
FIG. 11 is diagram showing the manufacturing process of the cleaning item of the third embodiment and is an exploded perspective view of the joining process.

Then, in the joining process, as shown in FIG. 10, the main cleaning part 45 is obtained by applying hot-melt 20 onto the strip sheet 5 of brush part 37 and joining with the brush part 37 while the two inserted parts 46 are parallel. The shape and positioning of respective inserted parts 46 can be selected accordingly, based on the insertion part of the gripper. For example, as in FIG. 11, the inserted part 46 can be only one. In addition, plural inserted parts can each be the same as in this embodiment, or they can differ. In this way, in the present invention, a plurality of inserted parts can be provided according to the number or shape of insertion parts on the gripper.

The present invention can be used preferably as a cleaning item for indoor-use which has fibrous material.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A cleaning item comprising:
   a brush part having a plurality of layers of fibrous material, wherein all said layers are bonded together at a single bonding line;
   an inserted part formed by a pair of sheets and disposed on the brush part, said inserted part having at least an inserted space for removably receiving a gripper; and
   a joining member provided onto only a portion of a top layer of the brush part to join the portion of the top layer, without joining remaining layers of the brush part, to the inserted part,
   wherein the single bonding line bonds only the fibrous layers of the brush part without bonding the layers of the brush part to the inserted part.

2. The cleaning item according to claim 1, wherein the joining member is adhesive.

3. The cleaning item according to claim 1, wherein the joining member joins the inserted part and the brush portion at a periphery of the inserted space.

4. The cleaning item according to claim 1, further comprising the gripper removably insertable the inserted space, wherein the gripper comprises:
   a base portion; and
   a plurality of insertion parts which extend substantially parallel from the base portion, and the inserted part comprises a plurality of inserted spaces into which the insertion parts are removably insertable.

5. The cleaning item according to claim 1, wherein a plurality of inserted parts into which a plurality of said insertion parts are positioned substantially parallel on said brush part.

6. The cleaning item according to claim 1, wherein said joining member is hot-melt.

7. The cleaning item according to claim 1, wherein the brush part comprises a tow fiber bundle and/or sheets cut into strips.

8. The cleaning item according to claim 1, wherein the brush part is bonded to the inserted part by the joining member only.

9. The cleaning item according to claim 1, wherein the sheets of inserted part are bonded together at sealing lines which are different from said joining member and said single bonding line.

10. The cleaning item according to claim 9, wherein said sheets of the inserted part comprises:
    a first sheet;
    a second sheet bonded to the first sheet along the sealing lines to define the inserted space between the first sheet and the second sheet,
    wherein said joining member is positioned between said sealing lines under the inserted space.

11. The cleaning item according to claim 1, wherein the joining member provided on the portion of the top layer of the brush part covers the single bonding line.

12. A cleaning item comprising:
    a brush part having a plurality of layers of fibrous material, wherein all said layers are bonded together at a single bonding line;
    an inserted part formed by a pair of sheets and disposed on the brush part, said inserted part having at least an inserted space for removably receiving a gripper; and
    a joining member provided onto only a portion of a top layer of the brush part to join the portion of the top layer, without joining remaining layers of the brush part, to the inserted part, wherein said joining member provided on the portion of the top layer of the brush part covers the single bonding line.

13. A cleaning item, comprising:
    a brush part having fibrous layers;
    an inserted part disposed on the brush part and formed by a pair of sheets;
    a joining member provided between the brush part and one of the sheets of the inserted part to join said brush part and the inserted part; and
    a single bonding line bonding all said fibrous layers of the brush part together, and without bonding the layers of the brush part to the inserted part.

14. The cleaning item according to claim 13, wherein said joining member is provided on only a portion of an uppermost layer of the brush part along the single bonding line.

15. The cleaning item according to claim 14, further comprising an inserted space arranged between the pair of the sheets of the inserted part, wherein said joining member is provided on the portion of the uppermost layer of the brush part corresponding to where the inserted space is arranged.

16. A cleaning item, comprising:
    a brush part having fibrous layers;
    an inserted part disposed on the brush part and formed by a pair of sheets;
    a joining member provided between the brush part and one of the sheets of the inserted part to join said brush part and the inserted part at a first bonded area;
    a single bonding line bonding all said fibrous layers of the brush part together at a second bonded area, and without bonding the layers of the brush part to the inserted part; and sealing lines bonding said two sheets of the inserted part together and defining at least an inserted space between the two sheets, wherein said first bonded area where the inserted part and the brush part directly contact and are bonded together by the joining member is greater than said second bonded area where all fibrous layers of the brush part are bonded together.

17. The cleaning item according to claim 16, wherein said joining member is adhesive, and said sealing lines and said single bonding line are heat seals.

18. The cleaning item according to claim 16, wherein said sheets of the inserted part include:

an upper sheet; and a lower sheet which faces the brush part and is directly bonded to an uppermost layer of said brush part at said first bonded area by said joining member, wherein the lower sheet of the inserted part has a section defined between the adjacent sealing lines and free of bonding to the upper sheet of the inserted part to form a bottom of the inserted space, and a lower surface of said section of the lower sheet of the inserted part has a portion under the portion of the upper sheet is directly bonded to the uppermost layer of the brush part.

19. The cleaning item according to claim 18, wherein said lower sheet of the inserted part is directly bonded to the uppermost layer of the brush part by the joining member which includes hot-melt dots arranged with spacings from each other within the first bonded area.

20. A cleaning item comprising:

a brush part having fibrous material;

an inserted part formed by a pair of sheets and disposed on the brush part, said inserted part having at least an inserted space for removably receiving a gripper; and a joining member provided onto only a portion of a surface of the brush part to join the portion of the surface, without joining a remaining portion of the brush part, to the inserted part, wherein the brush part includes a plurality of layers and all of the layers are bonded together at a single bonding line, and said joining member provided on the portion of the surface of the brush part covers the single bonding line.

\* \* \* \* \*